US007393916B2

(12) United States Patent
Neubauer et al.

(10) Patent No.: US 7,393,916 B2

(45) Date of Patent: Jul. 1, 2008

(54) METHOD OF REDUCING GELS IN POLYOLEFINS

(75) Inventors: Anthony Charles Neubauer, Piscataway, NJ (US); Fred D. Ehrman, Houston, TX (US); H. Rodney Tunnell, III, Charleston, WV (US)

(73) Assignee: Univation Technologies, LLC, Houston, TX (US)

(*) Notice: Subject to any disclaimer, the term of this patent is extended or adjusted under 35 U.S.C. 154(b) by 143 days.

(21) Appl. No.: 11/264,567

(22) Filed: Nov. 1, 2005

(65) Prior Publication Data

US 2007/0100132 A1 May 3, 2007

(51) Int. Cl.
*C08F 6/00* (2006.01)

(52) U.S. Cl. ...................... 528/480; 264/211; 525/240; 525/242

(58) Field of Classification Search ................ 264/211; 525/240, 242; 528/480
See application file for complete search history.

(56) References Cited

U.S. PATENT DOCUMENTS 3,891,499 A * 6/1975 Kato et al. ............... 162/157.5
5,730,885 A 3/1998 Blakeslee et al. ........... 210/773
6,274,684 B1 8/2001 Loveday et al.
6,485,662 B1 11/2002 Neubauer et al. ........... 264/169
6,875,828 B2 4/2005 Kuo et al.

FOREIGN PATENT DOCUMENTS

WO 2004/101674 A1 11/2004

OTHER PUBLICATIONS

Schonbauer, Gerhard; *Filtration of Polymer Melts*; (D. Gneuss, ed., VDI-Verlag GmbH, Düsseldorf 1981).

* cited by examiner

*Primary Examiner*—Terressa Boykin
(74) *Attorney, Agent, or Firm*—Kevin M. Faulkner; Leandro Arechederra

(57) ABSTRACT

A process of producing a polyolefin, in one embodiment a polyethylene, and in a preferred embodiment a bimodal polyethylene comprising a high molecular weight component and a low molecular weight component, the process comprising providing a polyolefin having an $I_{21}$ value of from 2 to 100 g/10 min and a density of from 0.91 to 0.97 g/cm$^3$; followed by forming a melt of the polyolefin and passing the polyolefin through one or more active screen filter(s) having a mesh size of from 70 to 200 micron at a mass flux of from 5 to 100 lbs/hr/square inch; and isolating the polyolefin having passed through the screen filter.

22 Claims, 2 Drawing Sheets

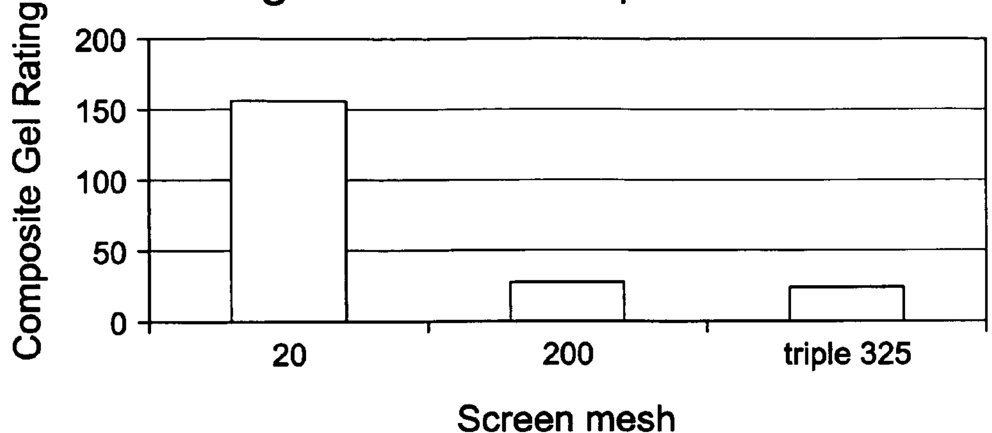
Fig. 1 Granule Sample #1
Composite Gel Rating
200
150
100
50
0
20
200
triple 325
Screen mesh
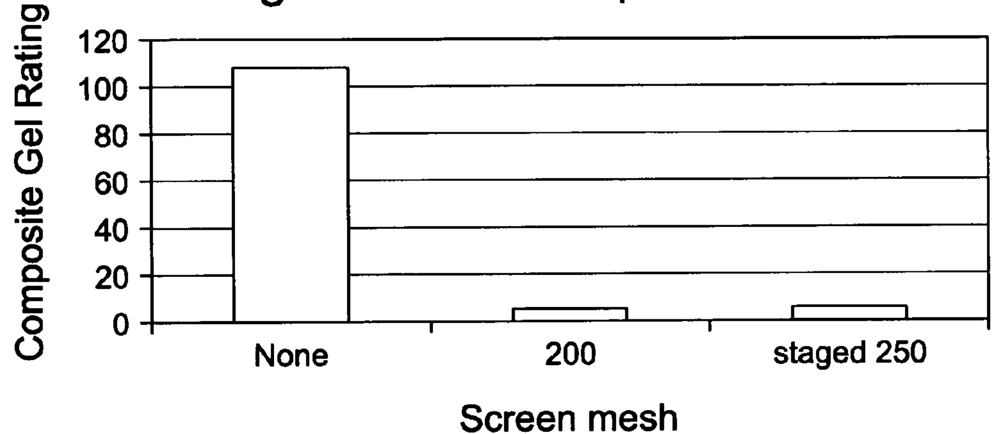
Fig. 2 Granule Sample #2
Composite Gel Rating
120
100
80
60
40
20
0
None
200
staged 250
Screen mesh
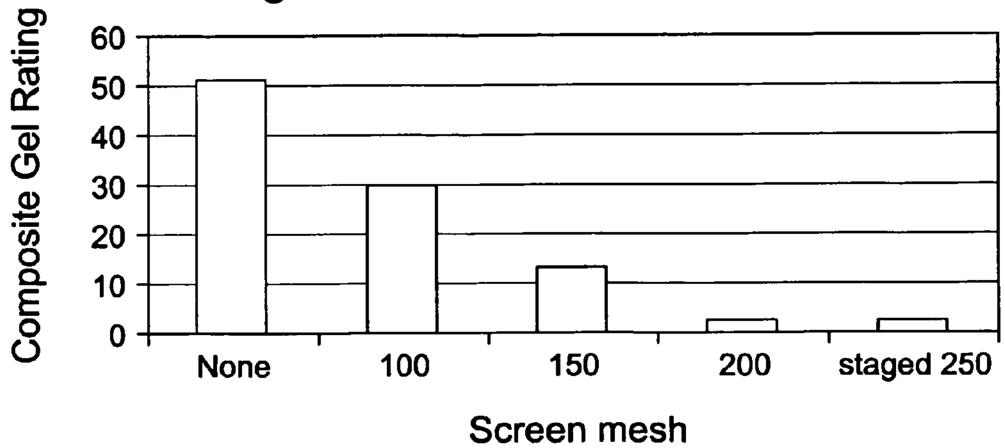
Fig. 3 Granule Sample #3
Composite Gel Rating
60
50
40
30
20
10
0
None
100
150
200
staged 250
Screen mesh Sample No. 3 Pressure rise with time
Day 1 - 2 hours
Day 2 - 2 hours
Day 3 - 4 hours
Day 4 - 5 hours
23 psi/hr including
3 extra S/U's
Gear pump
discharge pressure
psig
3600
3500
3400
3300
3200
3100
3000
0
2
4
6
8
10
12
14
16
18
20
Test Data Point

METHOD OF REDUCING GELS IN POLYOLEFINS

FIELD OF THE INVENTION

The present invention relates to methods of reducing the number of gels in polyolefins, and more particularly to a method of melt extruding polyethylene compositions through one or more active screen(s) in order to lower the number of gels in the melt and form a film having improved film appearance.

BACKGROUND OF THE INVENTION

The presence of "gels" is a common problem in polyolefins. The term "gels" refers to highly localized imperfections in the polyolefin, especially film made from polyolefin, that are visually distinct from the surrounding film, mostly due to the presence of either high concentrations of unblended polymer, unreacted catalyst and activator, or both, but can include other types of visually distinct imperfections as well. The presence of gels lowers the value of these films, and in some cases makes the films unmarketable. There have been many approaches in the past to solving this problem. One approach is to remove the gels prior to forming the finished product formed from the polyolefin having the gels. One approach in particular is that of filtering the polyolefin melt. This is described in general in FILTRATION OF POLYMER MELTS (D. Gneuss, ed., VDI-Verlag GmbH, Düsseldorf 1981). In particular, Gerhard Schönbauer describes using screen mesh to filter polymer melts in this publication. However, there are no specific solutions to removing gels common in polyolefin melts, especially polyethylene melts and bimodal or multimodal polyethylene melts.

Others have disclosed the use of screen mesh to filter polyolefin melts. In one approach to solving the problem of gels in polyolefin products, U.S. Pat. No. 5,730,885 discloses as a preferred approach to use multiple screens, those coarser than 250 mesh, thus avoiding undesirable back pressure and ripping of the screens. In a second approach, on the other hand, U.S. Pat. No. 6,485,662 discloses that a single active mesh screen that is relatively large mesh, those finer than 200 mesh having a micron retention size range of from 2 to 70 microns, in combination with several small mesh passive screens is desirable. These solutions are both somewhat inadequate because the first requires multiple active screens, increasing cost and complexity as well as being limited to polypropylene in its usefulness, while the second approach has the problem of high pressure drop and propensity for screens to plug quickly.

The present inventors have surprisingly found that a single, relatively coarse mesh size active screen can adequately filter polyolefin melts to commercially desirable levels. The inventors have also found that one, two, three, or four active screens are useful in producing gel free bimodal polyethylenes.

SUMMARY OF THE INVENTION

One aspect of the invention is directed to a process of producing a polyolefin, in a preferred embodiment a bimodal polyethylene comprising a high molecular weight component and a low molecular weight component, the process comprising providing a polyolefin having an $I_{21}$ value of from 2 to 100 g/10 min and a density of from 0.91 to 0.97 g/cm$^3$; followed by forming a melt of the polyolefin and passing the polyolefin through one active screen filter having a mesh size of from 70 to 200 micron at a mass flux of from 5 to 100 lbs/hr/square inch; and isolating the polyolefin having passed through the screen filter. In one embodiment, the polyolefin is a polyethylene having an $I_{21}$ of from 4 to 20 g/10 min and a density of from 0.93 to 0.96 g/cm$^3$.

Another aspect of the invention is directed to a process of producing a polyethylene, in a preferred embodiment a bimodal polyethylene comprising a high molecular weight component and a low molecular weight component, the process comprising providing a polyethylene having an $I_{21}$ value of from 2 to 100 g/10 min and a density of from 0.91 to 0.97 g/cm$^3$; followed by forming a melt of the polyethylene and passing the polyethylene through one or more, preferably one to four, active screen filter(s) having a mesh size of from 70 to 200 microns at a mass flux of from 5 to 100 lbs/hr/square inch; and isolating the polyethylene having passed through the screen filter. In one embodiment, the polyethylene has an $I_{21}$ of from 4 to 20 g/10 min and a density of from 0.93 to 0.96 g/cm$^3$. In another particular embodiment, the polyethylene has an $I_{21}$ of from 2 to 80 g/10 min and a density of from 0.91 to 0.93 g/cm$^3$.

These aspects may be combined with various embodiments disclosed herein to describe the invention(s).

BRIEF DESCRIPTION OF THE DRAWINGS

FIG. 1 is a graphical representation of the gel count results of Example 1.

FIG. 2 is a graphical representation of the gel count results of Example 2.

FIG. 3 is a graphical representation of the gel count results of Example 3.

DETAILED DESCRIPTION OF THE INVENTION

Figure 4:
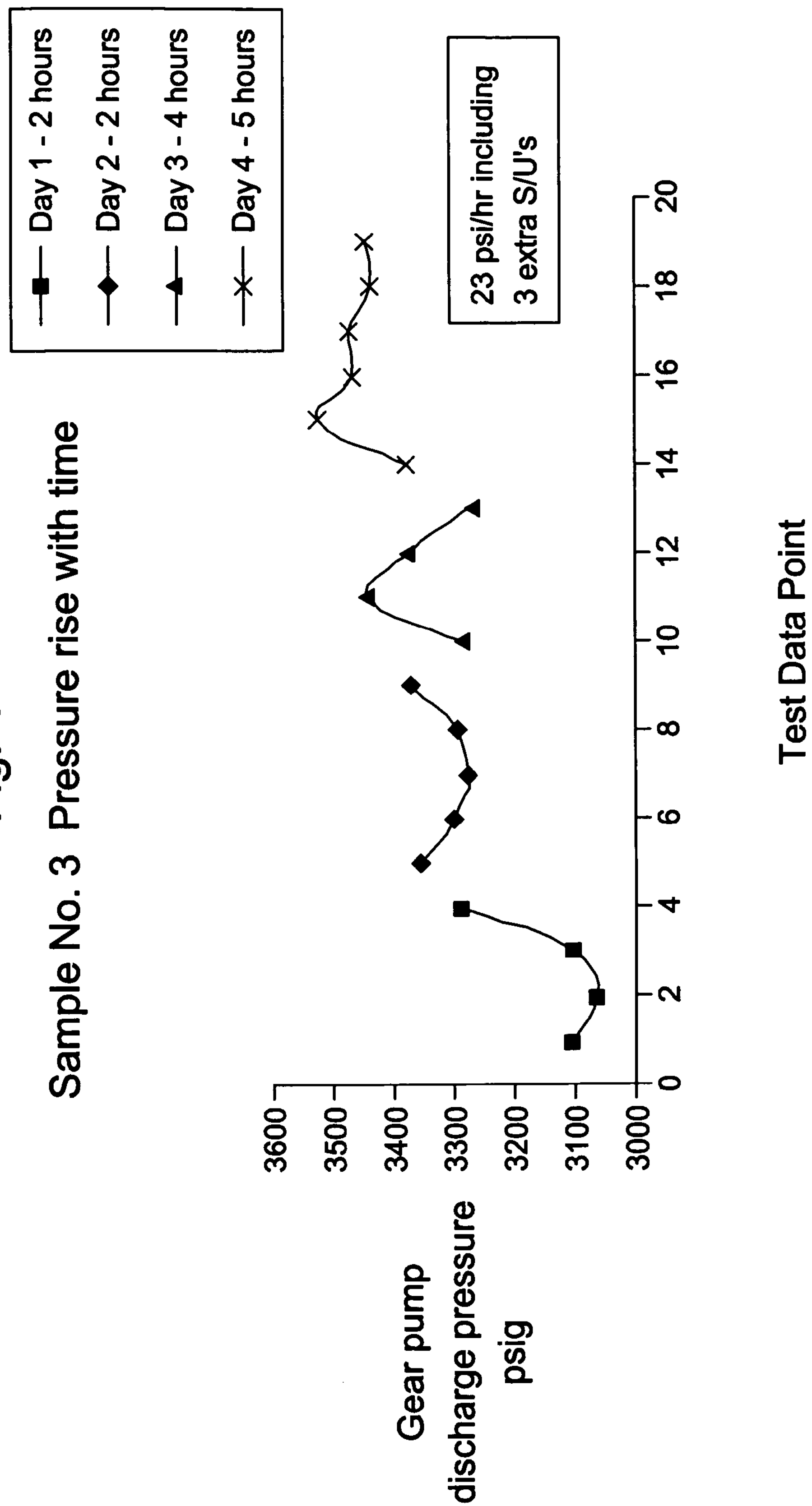
FIG. 4 is a graphical representation of the pressure rise history of Example 4.

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

The process of the present invention includes melt blending a polyolefin, preferably a polyethylene, most preferably a bimodal polyethylene powder, passing the melted, blended polymer through a filter screen pack, extruding the polymers through a die and then cooling the polymers.

The melting may be accomplished by heaters as are standard in the art, or in the blending device itself. The polyolefin may be further blended, and is preferably blended as well as melted in a sequential or simultaneous process in the same instrument. The melting, blending or "melt blending" may take place with extruders and processes for extrusion as are described in U.S. Pat. No. 4,814,135; U.S. Pat. No. 5,076,988; U.S. Pat. No. 5,153,382 and US publication 2005/0012235. For example, one can use screw extruders, either single or double screw type, for example, a ZSK co-rotating twin-screw extruder or a Killion single screw extruder. The screw portion of the extruder may be divided up into three sections, the feed section, the compression section, and the metering section, and may have multiple heating zones from the rear heating zone to the front heating zone, the multiple sections and zones running from upstream to downstream. If the extruder has more than one barrel, the barrels should be connected in series. The length to diameter ratio of each barrel is in the range of 16:1 to 40:1 in one embodiment. Blending of the component polymers can also be accomplished, for example, in a batch type mixer such as a BANBURY™ or a BRABENDER™ mixer. Tangential and intermeshing counter-rotating and intermeshing co-rotating mixers, two stage mixers, and multistage long length/diameter mixers can also be used. Also, the mixing systems in U.S. Pat. Nos. 4,334,783 and 5,458,474 are useful in another embodiment. The blending can take place at temperatures in the range of 160 to 270° C., and preferably is carried out at temperatures in the range of 180 to 240° C.

The blending step is followed by passing the polyolefin melt through a single active filter screen, which may be housed in a breaker plate. The screen filter may comprise a pack with one or more passive screens of 20 to 60 mesh size. The one or more active screens, only one in a preferred embodiment, is characterized by the number of wires per unit of the length in each direction, that is, its "mesh". A higher screen mesh, for a given filter, results in a smaller pore size; for example, 325 mesh screen has 42 micron openings. The inventors have found that 60 mesh (250 micron) and coarser openings are passive, whereas 80 mesh (177 micron) and finer openings are active, but without having to go to sizes so fine that back pressures in the melt process are undesirably high.

More particularly, the inventors have found that using one or more active screens, preferably one to four, even more preferably one to three, and most preferably one active screen having a mesh such that the openings are at from 70 to 210 micron, more preferably from 70 to 180 micron, and most preferably from 75 to 150 micron is both economical and sufficient to produce polyolefins having a commercially attractive appearance due to a lack of gels, especially when formed into films. Further, the inventors have found that the formation of the melt of the polyolefin that passes through the active screen(s) can be accomplished using an extruder having a gear pump, the extruder being operated such that the gear pump discharge pressure increases by less than 25%, preferably less than 20%, from the starting pressure per 24 hours of continuous output. This attribute of the process described herein further enhances the commercial attractiveness of this method of reducing gels in polyolefin melts.

It will be understood that the term "screen(s)" includes screens, sieves, and other filter media, and other equivalents for which the micron retention size can be determined. A description of various filter media can be found in, for example, FILTRATION OF POLYMER MELTS (1988). Generally, the screens are arranged by beginning with the larger micron retention size, proceeding to a smaller micron retention size, and ending with a larger micron retention size.

The active screens can be, for example, square weave wire screens and Dutch weave wire screens, one of which is described as, for example, a 200 mesh screen. The screens or equivalents can have closely spaced square openings, triangular openings, or round openings, regular or irregular in shape. With regard to equivalents, there are generally one or more layers corresponding to the one or more screens mentioned above. Equivalents are, for example, wire cloth screens, which have the disadvantage of letting certain soft particles slip through under pressure; sintered metal powders of the same or different diameters, but it is difficult to control the size of the spaces between the particles in order to approximate micron retention sizes; sintered metal fibers, a preferred equivalent; sand packs; and devices such as those described in U.S. Pat. No. 4,661,249.

The polyolefin melt is passed through the screen(s) at a mass flux in the range of 5 to 100 pounds per hour per square inch of active screen, and more preferably from 10 to 50 pounds per hour per square inch of active screen, and most preferably at a mass flux in the range of 30 to 80 pounds per hour per square inch of active screen. Generally, only one pass through the screen at the defined mass flux is sufficient to reduce the gels to 200 microns or less, usually less than 100 microns. It is found that at least a major proportion of the gels can be reduced to sizes of less than 100 microns by the process of the invention. Multiple passes can be used, if desired. Most preferably there is only one pass of polyolefin melt through the active screen(s).

The polyolefin can be extruded into film in a conventional extruder adapted for that purpose. Extruders and processes for extrusion are described in U.S. Pat. No. 4,169,679 (see screw design). Examples of various extruders, which can be used in forming the film are a single screw type such as one modified with a blown film die and air ring and continuous take off equipment, a blown film extruder, and a slot cast extruder. Twin screw extruders can also be used. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and multiple heating zones from the rear heating zone to the front heating zone, the multiple sections and zones running from upstream to downstream. If it has more than one barrel, the barrels are connected in series. The length to diameter ratio of each barrel is in the range of 16:1 to 30:1. The extrusion can take place at temperatures in the range of 160 to 270° C., and is preferably carried out at temperatures in the range of 180 to 240° C.

The polyolefin as described herein is any polymer comprising at least 50 to 80% by weight of the polymer of olefin, preferably $\alpha$-olefin derived units. Most preferably, the olefin derived units comprise ethylene and $\alpha$-olefins selected from the group consisting of $C_3$ to $C_{12}$ $\alpha$-olefins and cyclic olefins. Even more preferably, the polyolefin described herein is a polyethylene comprising at least 80 wt %, most preferably at least 80 wt % ethylene derived units and from 0 to 20 wt %, preferably from 1 to 10 wt % of $\alpha$-olefin derived units, wherein the $\alpha$-olefin is selected from the group consisting of $C_4$ to $C_8$ $\alpha$-olefins. In a preferable embodiment, the polyolefin is a bimodal or multimodal polyethylene. The term "bimodal," when used to describe the polyethylene composition, means "bimodal molecular weight distribution," which term is understood as having the broadest definition persons in the pertinent art have given that term as reflected in printed publications and issued patents. For example, a single polyethylene composition that includes polyolefins with at least one identifiable high molecular weight distribution and polyolefins with at least one identifiable low molecular weight distribution is considered to be a "bimodal" polyolefin, as that term is used herein. Those high and low molecular weight polymers may be identified by deconvolution techniques known in the art to discern the two polyolefins from a broad or shouldered GPC curve of the bimodal polyolefins of the invention, and in another embodiment, the GPC curve of the bimodal polymers of the invention may display distinct peaks with a trough. The polyolefin may be characterized by a combination of features.

In another embodiment, the polyolefin is a linear low density polyethylene (LLDPE) having a density of from 0.91 to 0.93 g/cm$^3$ and an $I_{21}$ of from 2 to 80 or 100 dg/min, and a molecular weight distribution ($M_w/M_n$) of from 2 to 5.

The polyolefin possesses a density in the range of 0.91 g/cm$^3$ to 0.97 g/cm$^3$ in one embodiment, in the range of from 0.93 g/cm$^3$ to 0.96 g/cm$^3$ in another embodiment, and in the range of from 0.94 g/cm$^3$ to 0.955 g/cm$^3$ in yet another embodiment, wherein a desirable density range of the polyolefin of the invention comprise any combination of any upper density limit with any lower density limit described herein.

The polyolefin can be characterized by their molecular weight characteristics such as measured by GPC, described herein. The polyolefin possesses an number average molecular weight (Mn) value of from 2,000 to 70,000 in one embodiment, and from 10,000 to 50,000 in another embodiment, and an weight average molecular weight (Mw) of from 50,000 to 2,000,000 in one embodiment, and from 70,000 to 1,000,000 in another embodiment, and from 80,000 to 800,000 in yet another embodiment. The polyolefin also possess a z-average molecular weight (Mz) value ranging from greater than 200,000 in one embodiment, and from greater than 800,000 in another embodiment, and from greater than 900,000 in one embodiment, and from greater than 1,000,000 in one embodiment, and greater than 1,100,000 in another embodiment, and from greater than 1,200,000 in yet another embodiment, and from less than 1,500,000 in yet another embodiment; wherein a desirable range of Mn, Mw or Mz comprises any combination of any upper limit with any lower limit as described herein.

The polyolefin possesses a molecular weight distribution—a weight average molecular weight to number average molecular weight ($M_w/M_n$), or "Polydispersity index"—of from greater than 30 or 40 in a preferable embodiment; and a range of from 20 to 250 in one embodiment, and from 35 to 100 in another embodiment, and from 40 to 200 in yet another embodiment, wherein a desirable embodiment comprises any combination of any upper limit with any lower limit described herein. The polyolefin also possesses a "z-average" molecular weight distribution ($M_z/M_w$) of from 2 to 20 in one embodiment, from 3 to 20 in another embodiment, and from 4 to 10 in another embodiment, and from 5 to 8 in yet another embodiment, and from 3 to 10 in yet another embodiment, wherein a desirable range may comprise any combination of any upper limit with any lower limit.

The polyolefin possess a melt index (MI, or $I_2$ as measured by ASTM-D-1238-E 190° C./2.16 kg) in the range from 0.01 dg/min to 50 dg/min in one embodiment, and from 0.02 dg/min to 10 dg/min in another embodiment, and from 0.03 dg/min to 2 dg/min in yet another embodiment, wherein a desirable range may comprise any upper limit with any lower limit described herein. The polyolefin possesses a flow index (FI or $I_{21}$ as measured by ASTM-D-1238-F, 190° C./21.6 kg) ranging from 2 to 20 dg/min in one embodiment, and from 4 to 18 dg/min in another embodiment, and from 4 to 16 dg/min in yet another embodiment, and from 6 to 14 dg/min in yet another embodiment; and a range of from 6 to 12 dg/min in yet another embodiment, wherein a desirable $I_{21}$ range may comprise any upper limit with any lower limit described herein. The polyolefin in certain embodiments possesses a melt index ratio ($I_{21}/I_2$) of from 80 to 400, and from 90 to 300 in another embodiment, and from 100 to 250 in yet another embodiment, and from 120 to 220 in yet another embodiment, wherein a desirable $I_{21}/I_2$ range may comprise any combination of any upper limit with any lower limit described herein.

In another embodiment, the polyolefin comprise greater than 50 wt % by weight of the total composition of HMW polyethylene, and greater than 55 wt % in another embodiment, and in another embodiment, between 50 and 80 wt %, and between 55 and 75 wt % in yet another embodiment, and between 55 and 70 wt % in yet another embodiment, the weight percentages determined from GPC measurements.

In the embodiment where the polyolefin is a bimodal polyethylene, the bimodal polyethylene can be described in one embodiment as comprising one HMW polyethylene and one LMW polyethylene; and in another embodiment, the consisting essentially of one HMW polyethylene and one LMW polyethylene.

In one embodiment, the molecular weight distribution (Mw/Mn) of the HMW polyethylene ranges from 3 to 24, and ranges from 4 to 24 in another embodiment, and from 6 to 18 in another embodiment, and from 7 to 16 in another embodiment, and from 8 to 14 in yet another embodiment, wherein a desirable range comprises any combination of any upper limit with any lower limit described herein. The HMW polyethylene has a weight average molecular weight ranging from greater than 50,000 amu in one embodiment, and ranging from 50,000 to 1,000,000 amu in one embodiment, and from 80,000 to 900,000 amu in another embodiment, and from 100,000 to 800,000 amu in another embodiment, and from 250,000 to 700,000 amu in another embodiment, wherein a desirable range comprises any combination of any upper limit with any lower limit described herein. The weight fraction of the HMW polyethylene in the polyethylene composition ranges may be at any desirable level depending on the properties that are desired in the polyethylene composition; in one embodiment the HMW polyethylene weight fraction ranges from 0.3 to 0.7; and from 0.4 to 0.6 in another particular embodiment, and ranges from 0.5 and 0.6 in yet another particular embodiment.

In one embodiment, the molecular weight distribution (Mw/Mn) of the LMW polyethylene ranges from 1.8 to 6, and from 2 to 5 in another embodiment, and from 2.5 to 4 in yet another embodiment, wherein a desirable range comprises any combination of any upper limit with any lower limit described herein. The LMW polyethylene has a weight average molecular weight ranging from 2,000 to 50,000 amu in one embodiment, and from 3,000 to 40,000 in another embodiment, and from 4,000 to 30,000 amu in yet another embodiment wherein a desirable range of LMW polyethylene in the polyethylene composition comprises any combination of any upper limit with any lower limit described herein. In another embodiment, the weight average molecular weight of the LMW polyethylene is less than 50,000 amu, and less than 40,000 amu in another embodiment, and less than 30,000 amu in yet another embodiment, and less than 20,000 amu in yet another embodiment, and less than 15,000 amu in yet another embodiment, and less than 13,000 amu in yet another embodiment. The LMW polyethylene has an $I_2$ value of from 0.1 to 10,000 dg/min in one embodiment, and from 1 to 5,000 dg/min in another embodiment, and from 100 to 3,000 dg/min in yet another embodiment; and an $I_{21}$ of from 2.0 to 300,000 dg/min in one embodiment, from 20 to 150,000 dg/min in another embodiment, and from 30 to 15,000 dg/min in yet another embodiment; wherein for the $I_2$ and $I_{21}$ values, a desirable range comprises any combination of any upper limit with any lower limit described herein. The $I_2$ and $I_{21}$ of the LMW polyethylene may be determined by any technique known in the art, especially when made separately and thus individually measurable; and in one embodiment these values are estimated by deconvolution of the GPC curve and use of mathematical models known in the art.

In the embodiment wherein the polyolefin is a bimodal polyethylene, the bimodal polyethylene can be produced by any technique known in the art, including physical blending of two different molecular weight polyethylenes or in-situ reactor blending in two or more reactors in series such as is known in the art, or by in-situ reactor blending in a single reactor. In one embodiment, the bimodal polyethylene is one as described above having been produced in a single reactor, preferably a single continuous gas phase fluidized bed reactor, using a bimetallic catalyst composition. Such bimetallic catalyst compositions are known in the art and described in, for example, U.S. Pat. No. 6,274,684 or U.S. Pat. No. 6,875,828. In one embodiment in particular, the bimetallic catalyst is a supported Group 4 metallocene and Group 4 coordination compound (e.g., [(alkyl-$C_6H_2$)$NCH_2CH_2$]$_2$NH}Zr(alkyl, aryl or halide)$_2$), and in another embodiment, the bimetallic catalyst is a supported metallocene and vanadium or titanium Ziegler-Natta catalyst compound, and in another embodiment, the bimetallic catalyst is a supported chromium based, preferably chromium oxide, catalyst composition known to produce broad to bimodal polyethylene compositions.

In a particular embodiment, the bimodal polyethylene useful in the invention is made in a single continuous gas phase fluidized bed reactor as an in-situ blend of at least one high molecular weight component and at least one low molecular weight component. In one or more embodiments, the polymerization system can include a reactor body in fluid communication with one or more discharge tanks, surge tanks, and recycle compressors. In one embodiment, the reactor body includes a reaction zone within the reactor body in fluid communication with a velocity reduction zone, typically at the top of the reactor body and having a conical geometry with increasing diameter. The reaction zone can include a bed of growing polymer particles, formed polymer particles and catalyst particles fluidized by the continuous flow of polymerizable and modifying gaseous components in the form of make-up feed and recycle fluid through the reaction zone.

A feed stream can be directed to enter the cycle line before the blower but may also be at any point in the polymerization system including to the reactor fluid bed, the expanded section or to the cycle line before or after the cooler as depicted with alternative feed stream location. The term "feed stream" as used herein refers to a raw material, either gas phase or liquid phase, used in a polymerization process to produce a polymer product. For example, a feed stream may be any olefin monomer including substituted and unsubstituted alkenes having two to 12 carbon atoms, such as ethylene, propylene, 1-butene, 1-pentene, 4-methyl-1-pentene, 1-hexene, 1-octene, 1-decene, 1-dodecene, styrene, and derivatives thereof. The feed stream also includes non-olefinic gas such as nitrogen and hydrogen. The feeds may enter the reactor at multiple and different locations. For example, monomers can be introduced into the polymerization zone in various ways including direct injection through a nozzle into the bed. The feed stream may further include one or more non-reactive alkanes that may be condensable in the polymerization process for removing the heat of reaction. Illustrative non-reactive alkanes include, but are not limited to, propane, butane, isobutane, pentane, isopentane, hexane, isomers thereof and derivatives thereof. Such operation is referred to in the art as "condensed mode" operation.

The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone, the superficial gas velocity through the bed must exceed the minimum flow required for fluidization. Preferably, the superficial gas velocity is at least two times the minimum flow velocity. Ordinarily, the superficial gas velocity does not exceed 5.0 ft/sec and usually no more than 2.5 ft/sec is sufficient.

In general, the height to diameter ratio of the reaction zone can vary in the range of from 2:1 to 5:1. The range, of course, can vary to larger or smaller ratios and depends upon the desired production capacity. The cross-sectional area of the velocity reduction zone is typically within the range of 2 to 3 multiplied by the cross-sectional area of the reaction zone.

The velocity reduction zone has a larger inner diameter than the reaction zone. As the name suggests, the velocity reduction zone slows the velocity of the gas due to the increased cross sectional area. This reduction in gas velocity drops the entrained particles into the bed, allowing primarily only gas to flow from the reactor. That gas exiting the overhead of the reactor is the recycle gas stream.

The recycle stream is compressed in a compressor and then passed through a heat exchange zone where heat is removed before it is returned to the bed. The heat exchange zone is typically a heat exchanger which can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream is returned to the reactor. The cooled recycle stream absorbs the heat of reaction generated by the polymerization reaction.

Preferably, the recycle stream is returned to the reactor and to the fluidized bed through a gas distributor plate. A gas deflector is preferably installed at the inlet to the reactor to prevent contained polymer particles from settling out and agglomerating into a solid mass and to prevent liquid accumulation at the bottom of the reactor as well to facilitate easy transitions between processes which contain liquid in the cycle gas stream and those which do not and vice versa. An illustrative deflector suitable for this purpose is described in U.S. Pat. Nos. 4,933,415 and 6,627,713.

An activated precursor composition with or without an aluminum alkyl modifier (hereinafter collectively referred to as catalyst) is preferably stored for service in a catalyst reservoir under a blanket of a gas which is inert to the stored material, such as nitrogen or argon. Preferably, the catalyst reservoir is equipped with a feeder suitable to continuously feed the catalyst into the reactor. An illustrative catalyst reservoir is shown and described in U.S. Pat. No. 3,779,712, for example. A gas that is inert to the catalyst, such as nitrogen or argon, is preferably used to carry the catalyst into the bed. Preferably, the carrier gas is the same as the blanket gas used for storing the catalysts in the catalyst reservoir. In one embodiment the catalyst is a dry powder and the catalyst feeder comprises a rotating metering disk. In another embodiment the catalyst is provided as a slurry in mineral oil or liquid hydrocarbon or mixture such as for example propane, butane, isopentane, hexane, heptane or octane. An illustrative catalyst reservoir is shown and described in WO 2004094489. The catalyst slurry may be delivered to the reactor with a carrier fluid, such as, for example, nitrogen or argon or a liquid such as for example isopentane or other $C_3$ to $C_8$ alkane. It is possible to modify the catalyst during delivery to the reactor along the feed addition line with the aluminum alkyl modifiers, which are described elsewhere herein.

The catalyst is injected at a point into the bed where good mixing with polymer particles occurs. For example, the catalyst is injected into the bed at a point above the distributor plate. Injecting the catalyst at a point above the distribution plate provides satisfactory operation of a fluidized-bed polymerization reactor. Injection of the catalyst into the area below the distributor plate could cause polymerization to begin there and eventually cause plugging of the distributor plate. Injection directly into the fluidized bed aids in distributing the catalyst uniformly throughout the bed and tends to avoid the formation of localized spots of high catalyst concentration which can cause "hot spots" to form. An activator and/or modifier compound (e.g., an aluminum alkyl compound, a non-limiting illustrative example of which is triethyl aluminum), can also be added to the reaction system either directly into the fluidized bed or downstream of the heat exchanger, in which case the modifier is fed into the recycle system from a dispenser.

The polymerization reaction is conducted substantially in the absence of catalyst poisons such as moisture, oxygen, carbon monoxide and acetylene. However, oxygen can be added back to the reactor at very low concentrations to alter the polymer structure and its product performance characteristics. Oxygen may be added at a concentration relative to the ethylene feed rate to the reactor of 10 to 600 ppbv, and more preferably 10 to 500 ppbv.

In order to achieve the desired density ranges in the copolymers it is necessary to copolymerize enough of the comonomers with ethylene to achieve a level of 0 to anywhere from 5 to 10 weight percent of the comonomer in the copolymer. The amount of comonomer needed to achieve this result will depend on the particular comonomer(s) being employed, the activation temperature of the catalyst and its formulation. The ratio of the comonomer to ethylene should be controlled to obtain the desired resin density of copolymer product.

A gas analyzer can be used to determine the composition of the recycle stream and the composition of the make-up feed stream and can be adjusted accordingly to maintain an essentially steady state gaseous composition within the reaction zone. The gas analyzer can be a conventional gas analyzer that determines the recycle stream composition to maintain the ratios of feed stream components. Such equipment is commercially available from a wide variety of sources. The gas analyzer may be positioned to receive gas from a sampling point located between the velocity reduction zone and heat exchanger.

The rate of polymer production in the bed depends on the rate of catalyst injection and the concentration of monomer(s) in the reaction zone. The production rate is conveniently controlled by adjusting the rate of catalyst injection. Since any change in the rate of catalyst injection will change the reaction rate and thus the rate at which heat is generated in the bed, the temperature of the recycle stream entering the reactor is adjusted to accommodate any change in the rate of heat generation. This ensures the maintenance of an essentially constant temperature in the bed. Complete instrumentation of both the fluidized bed and the recycle stream cooling system is, of course, useful to detect any temperature change in the bed so as to enable either the operator or a conventional automatic control system to make a suitable adjustment in the temperature of the recycle stream.

Under a given set of operating conditions, the fluidized bed is maintained at essentially a constant height by withdrawing a portion of the bed as product at the rate of formation of the particulate polymer product. Since the rate of heat generation is directly related to the rate of product formation, a measurement of the temperature rise of the fluid across the reactor (the difference between inlet fluid temperature and exit fluid temperature) is indicative of the rate of particulate polymer formation at a constant fluid velocity if no or negligible vaporizable liquid is present in the inlet fluid.

On discharge of particulate polymer product from gas phase fluidized bed reactor body, it is desirable and preferable to separate fluid from the product and to return the fluid to the recycle line. There are numerous ways known to the art to accomplish this separation. In one or more embodiments, fluid and product leave the reactor body and enter the product discharge tanks through valve, which may be a ball valve designed to have minimum restriction to flow when opened. Positioned above and below the product discharge tank are conventional valves. The valve allows passage of product into the product surge tanks. Another preferred product discharge system which may be alternatively employed is that disclosed and claimed in U.S. Pat. No. 4,621,952. Such a system employs at least one (parallel) pair of tanks comprising a settling tank and a transfer tank arranged in series and having the separated gas phase returned from the top of the settling tank to a point in the reactor near the top of the fluidized bed.

The fluidized-bed reactor is equipped with an adequate venting system to allow venting the bed during start up and shut down. The reactor does not require the use of stirring and/or wall scraping. The recycle line and the elements therein should be smooth-surfaced and devoid of unnecessary obstructions so as not to impede the flow of recycle fluid or entrained particles.

The conditions for polymerizations vary depending upon the monomers, catalysts and equipment availability. The specific conditions are known or readily derivable by those skilled in the art. For example, the temperatures are within the range of from −10° C. to 120° C., often 15° C. to 110° C. Pressures are within the range of from 0.1 bar to 100 bar, such as 5 bar to 50 bar, for example. Additional details of polymerization can be found in U.S. Pat. No. 6,627,713.

Once the polyolefin is isolated, it can be blended with certain additives as is known in the art. Conventional additives, which can be introduced into the polyolefin, are exemplified by antioxidants, ultraviolet absorbers, antistatic agents, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents. Aside from the fillers, the additives can be present in the blend in amounts of 0.1 to 10 parts by weight of additive for each 100 parts by weight of polymer blend. Fillers can be added in amounts up to 200 parts by weight and more for each 100 parts by weight of the polyolefin.

In one embodiment, an oxidizing agent is also added during the melting step as a reactive component with the polyolefin. In this aspect of the methods described herein, the polyolefin is extruded with an oxidizing agent, preferably oxygen, as disclosed in WO 03/047839. In one embodiment, from 0.01 or 0.1 or 1 to 14 or 16 SCFM (standard cubic feet per minute) of oxygen is added to the polyolefin during extrusion to form the film, the exact amount depending upon the type of extruder used and other conditions. Stated alternately, from between 10 and 21% by volume of oxygen in an inert gas such as nitrogen is introduced to the extruding polymer composition in one embodiment. In one embodiment, enough oxygen is added to the extruder to raise the $I_{21}/I_2$ value of the polyethylene composition from the reactor(s) by from 1 to 40%, and from 5 to 25% in another embodiment. The polyolefin pellets produced therefrom are then used to extrude the films of the invention in a separate line, for example, and Alpine line.

The resultant polyolefin, having been filtered, with or without additives, can be processed by any suitable means for forming films: film blowing or casting and all methods of film formation to achieve, for example, uniaxial or biaxial orientation such as described in PLASTICS PROCESSING (Radian Corporation, Noyes Data Corp. 1986). In a particularly preferred embodiment, the polyolefin is formed into films such as described in the FILM EXTRUSION MANUAL, PROCESS, MATERIALS, PROPERTIES (TAPPI, 1992). Even more particularly, the films are blown films, the process for which is described generally in FILM EXTRUSION MANUAL, PROCESS, MATERIALS, PROPERTIES pp. 16-29, for example.

Any extruder suitable for extrusion of a LLDPE (density between 0.91 and 0.925 g/cm$^3$) or HDPE (density greater than 0.940 g/cm$^3$) operating under any desirable conditions for the polyethylene compositions described herein can be used to produce the films. Such extruders are known to those skilled in the art. Such extruders include those having screw diameters ranging from 30 to 150 mm in one embodiment, and from 35 to 120 mm in another embodiment, and having an output of from 100 to 1,500 lbs/hr in one embodiment, and from 200 to 1,000 lbs/hr in another embodiment. In one embodiment, a grooved feed extruder is used. The extruder may possess a L/D ratio of from 80:1 to 2:1 in one embodiment, and from 60:1 to 6:1 in another embodiment, and from 40:1 to 12:1 in yet another embodiment, and from 30:1 to 16:1 in yet another embodiment.

A mono or multi-layer die can be used. In one embodiment a 50 to 200 mm monolayer die is used, and a 90 to 160 mm monolayer die in another embodiment, and a 100 to 140 mm monolayer die in yet another embodiment, the die having a nominal die gap ranging from 0.6 to 3 mm in one embodiment, and from 0.8 to 2 mm in another embodiment, and from 1 to 1.8 mm in yet another embodiment, wherein a desirable die can be described by any combination of any embodiment described herein. In a particular embodiment, the advantageous specific throughputs claimed herein are maintained in a 50 mm grooved feed extruder with an L/D of 21:1 in a particular embodiment.

The temperature across the zones of the extruder, neck and adapter of the extruder ranges from 150° C. to 230° C. in one embodiment, and from 160° C. to 210° C. in another embodiment, and from 170° C. to 190° C. in yet another embodiment. The temperature across the die ranges from 160° C. to 250° C. in one embodiment, and from 170° C. to 230° C. in another embodiment, and from 180° C. to 210° C. in yet another embodiment.

The quality of the films of the present invention can be characterized by the composite gel count, as described herein. The films have a gel count of less than 100 in one embodiment, and a gel count of less than 60 in another embodiment, and a gel count of less than 50 in another embodiment, and a gel count of less than 40 in yet another embodiment, and a gel count of less than 35 in yet another embodiment. Described alternately, the films of the present invention have a FAR ("film appearance rating", visual comparison test to known standards) value of greater than +20 in one embodiment, and greater than +30 in another embodiment, and greater than +40 in yet another embodiment.

Thus, the compositions and processes of the present invention can be described alternately by any of the embodiments disclosed herein, or a combination of any of the embodiments described herein. Embodiments of the invention, while not meant to be limiting by, may be better understood by reference to the following examples.

EXAMPLES

For all the examples, the first table shows conditions for the original extrusion of polyethylene granules into pellets. For each example, the intent was to hold the extrusion conditions constant, varying only the screen mesh used. However, varying screen mesh causes some changes in other process data, for example, in G/P (Gear Pump) discharge pressure. The second table shows the extrusion conditions used as the polyethylene pellets were converted into film and the gel-count data on that film.

The quantity of "gels", or gel "rating", was determined using an OCS Gel Counting Apparatus. The OCS Gel Counting Line consists of the following pieces of equipment:

1) Brabender Extruder with a ¾ inch 20:1 L/D compression screw
2) Adjustable film slit die
3) OCS model FS3
4) Killion chill roll and a film take-up system.

The OCS system evaluates slightly over 1.0 m$^2$ of film per test. The targeted film thickness is 76.2 μm (0.003 inch or 3.0 mil). The OCS Model FS3 camera has a resolution of 7 μm and reads a film width of 12 mm and the system identifies 10 class sizes of gels as listed below:

| |
|---|
| 7 to 54 μm, |
| 55 to 100 μm, |
| 101 to 200 μm, |
| 201 to 300 μm, |
| 301 to 400 μm, |
| 401 to 500 μm, |
| 501 to 600 μm, |
| 601 to 800 μm, |
| 801 to 1600 μm, |
| greater than 1600 μm. |

The OCS system, at the completion of each test, generates a summary of the gel data per 1.0 m$^2$ of film. A composite gel count is reported. This rating is calculated as:

$$\text{Composite gel count} = 0.1 \times \text{Gel Count}(101 \text{ to } 200\ \mu\text{m}) + 1.0 \times \text{Gel Count}(201 \text{ to } 500\ \mu\text{m}) + 10 \times \text{Gel Count}(\text{Gels greater than } 501\ \mu\text{m}).$$

This composite gel count roughly approximates how a film customer will react to gels in the film, with lower "Composite Gel counts" being better. The "Composite Gel count" uses a higher penalty for larger gels, because they are more visible and more likely to cause problems in the final product usage.

Example 1

Compares 20, 200, and staged 325 mesh. Polyethylene granules were extruded into pellets either without any additives, or and blended with the following additives ("Formula A"):

| | |
|---|---|
| Irganox-1010 | 0.1500 wt % |
| Irgafos-168 | 0.1500 wt % |
| Zinc Stearate | 0.0500 wt % |

These pellets were used to form the films. General conditions for the extrusion into pellets are as follows:

Barrel temperature set point, 180° C.
Ambient feed temperature.
Less than 1% oxygen.
Mixer speed, 220 rpm.
Mixer feed rate, 410 lbs/hr.
Gate position, 5%.
Melt pump suction pressure, 7 psig.
Screen changer with a 4.5 inch diameter the breaker plate.

See Tables 1 and 2 for the conditions of pelletizing and film extrusions, respectively. FIG. 1 shows the gel count results. Data for 20 mesh were from a single condition, data for 200 mesh are the average of 8 conditions and 8 gels counts, data for triple 325 mesh are the average of 2 conditions and 2 gel counts. See Table 1 for an exact description of the screen packs used. For example, the "triple 325" screenpack used 20 mesh then 100 mesh then 325 mesh then 325 mesh then 325 mesh then 100 mesh then 20 mesh screens in series, with the coarser screens providing mechanical support for the fine and mechanically weak 325 mesh screens. Compared to prior art, 200 mesh performed better than expected.

Samples 1, 2 and 3 each correspond to bimodal, high density polyethylene copolymers (1-hexene or 1-butene derived comonomer units) having a density of from 0.948 to 0.952 g/cm$^3$, and an $I_{21}$ of from 7 to 11 dg/min, and an Mw/Mn of between 40 and 100, each produced in a single continuous gas phase fluidized bed reactor using a bimetallic catalyst system producing intimately blended low and high molecular weight copolymers, the low molecular weight portion having a weight average molecular weigh of from 5,000 to 30,000 amu., and the high molecular weight portion having a weight average molecular weight of from 80,000 to 150,000 amu.

Example 2

Compares no screen, 200 mesh, and staged 250 mesh. See Example 1 for a description of the additives used to form the pellets and general extrusion conditions. All data are from single extended extrusion conditions. See Tables 3 and 4 for the conditions of pelletizing and film extrusions, respectively ("G/P" refers to gear pump). FIG. 2 shows the gel count results. Surprisingly, a single 200 mesh screenpack (20/100/200/100/20 mesh) reduced gels as well as a screenpack with two 250 mesh screens (20/100/250/100/250/100/20 mesh).

Example 3

Compares no screen, 100, 150, 200, and staged 250 mesh. See Example 1 for a description of the additives used to form the pellets and general extrusion conditions. All data are from single extended extrusion conditions. 100 and 150 mesh performed surprisingly well. See Tables 5 and 6 for the conditions of pelletizing and film extrusions, respectively. FIG. 3 shows the gel count results.

Example 4

Shows screen pack pressure rise is low during extended, stable run with 200 mesh screenpack. Granule sample number 3 was run for a total of 14.25 hours over 4 days, using a screenpack consisting of 20/100/200/100/20 mesh in series. The 20 mesh filters are passive. See Table 7 for the pelletizing conditions and FIG. 4 for the pressure rise history. Gear pump discharge pressure increased from 3105 to 3446 psi, which is 24 psi per hour of operation or only 0.8% per hour of operation. This is commercially acceptable and shows the benefit of using relatively coarse screens to reduce gels.

From these data, it can be seen that mesh sizes of 200, 150 and 100 (about 70 to about 210 micron size) are particularly useful as active screens in removing gels from polyolefins, especially in bimodal polyethylenes. Surprisingly, it has been found that just one such screen is useful, and two to three are particularly useful, while at the same time operations can take place such that acceptably low backpressures are maintained, as shown in FIG. 4.

TABLE 1

Example 1--Granule Extrusion and Screening Conditions

| | Test Number | | |
|---|---|---|---|
| | 1 | 2 | 3 |
| Granule Sample | 1 | 2 | 2 |
| Feed Rate, lb/hr | 410.0 | 410 | 410 |
| Additive Formulation | None | None | None |
| Mixer Speed, rpm | 221.6 | 222.4 | 221.4 |
| Barrel Oil Temp. Set Point, ° C. | 180.0 | 180 | 180 |
| Gate Position, % | 5.0 | 5 | 5 |
| Oxygen Conc. - Supply, % | 0.6 | 0.2 | 0.5 |
| Oxygen Conc. - Feed Hopper, % | 0.4 | 0.4 | 0.4 |
| Oxygen Conc. - Vent, % | 0.5 | 0.1 | 0.2 |
| Feed Temp., ° C. | 20.4 | 19.4 | 19.7 |
| Cal. Polymer Temp. on GMP, ° C. | 419.3 | 369.0 | 411.6 |
| Mixer Torque, in-lb | 18570.0 | 16865 | 18431 |
| Mixer Power on Torque, kw | 47.7 | 43.5 | 47.3 |
| Cal. Power on Torque, kw | 48.7 | 44.4 | 48.3 |
| Mixer SEI on Torque, hp-hr/lb | 0.1561 | 0.1422 | 0.1547 |
| Cal. Polymer Temp. on Torque, ° C. | 263.9 | 237.7 | 260.9 |
| Gate Indicated Temperature, ° C. | 184.0 | 182.8 | 184.5 |
| Ind. Discharge Polymer Temp., ° C. | 240.1 | 229.6 | 240.6 |
| Ind. Transition Temperature, ° C. | 1200.0 | 1200 | 1200 |
| G/P Discharge Pressure, psig | 2052.5 | 3739.8 | 4336.4 |
| G/P Discharge Temperature, ° C. | 195.7 | 201.6 | 205.2 |
| G/P Speed, rpm | 5.1 | 7.3 | 8.6 |
| G/P Current, amps | 34.1 | 51.6 | 57.3 |
| G/P Volumetric Efficiency, % | 89.2 | 62.4 | 53.6 |
| G/P Fill Factor | 0.146 | 0.2105 | 0 |
| Gross G/P Power, kw | 3.3 | 6.4 | 8.3 |
| G/P Torque, in-lb | 711.0 | 1027.1 | 1136.0 |
| G/P Power, kw | 2.3 | 4.8 | 6.3 |
| G/P SEI, hp-hr/lb | 0.0075 | 0.0157 | 0.0204 |
| Calculated Delta Temperature, ° C. | 8.4 | 19.0 | 26.1 |
| Die Pressure, psig | 1537.2 | 1568.5 | 1459.7 |
| Ind. Die Melt Temperature, ° C. | 225.9 | 225.0 | 225.6 |
| Screen Mesh - 1 Bolt | 20 | 20/100/200/100/20 | 20/100/325/325/325/100/20 |

TABLE 2

Example 1--Film Extrusion Conditions and Gel Count Data

| | Test Number | | |
|---|---|---|---|
| | 1 | 2 | 3 |
| Zone 1 Temp (° C.): - STPT/Actual | 215 | 215 | 215 |
| Zone 2 Temp (° C.): - STPT/Actual | 235 | 235 | 235 |
| Die Temp (° C.): - STPT/Actual | 235 | 235 | 235 |
| Extruder RPM 0-100 (RPM) | 50 | 50 | 50 |
| Extruder Torque (MG) | 2827 | 3031 | 2891 |
| Barrel discharge melt pressure (PSI) | 1484 | 1452 | 1412 |
| Barrel discharge melt temperature (° C.) | 228 | 223 | 226 |
| Die melt temperature (PSI) | 1160 | 1141 | 1106 |
| Die discharge melt temperature (° C.) | 253 | 244 | 248 |
| Chiller water temperature, STPT(° C.) | 60 | 60 | 60 |
| Chill rolls, STPT (% Motor) | 28 | 28 | 28 |
| Tension Roll Speed STPT (F/MIN) | 10 | 10 | 10 |
| Film thickness (Microns) | 51 | 63 | 63 |

TABLE 2-continued

Example 1--Film Extrusion Conditions and Gel Count Data

| | Test Number | | |
|---|---|---|---|
| | 1 | 2 | 3 |
| Chill roll gap | Open | Open | Open |
| Chill roll follower gap | Open | Open | Open |
| Screen pack installed | None | None | None |
| Air curtain used (Y [SCFM]/N) | Y | Y | Y |
| OCS Film Clarity (%) | 22.5 | 22.2 | 23 |
| OCS Grey Level | 150 | 150 | 150 |
| Total Gels avg/[$m^2$] | 4769 | 2694 | 2997 |
| size/[micron], 7 to 54 | 3954 | 2095 | 2529 |
| size/[micron], 55 to 100 | 564 | 474 | 394 |
| size/[micron], 101 to 200 | 197 | 118 | 64 |
| size/[micron], 201 to 300 | 35 | 3 | 7 |
| size/[micron], 301 to 400 | 9 | 2 | 1 |
| size/[micron], 401 to 500 | 2 | 0 | 1 |
| size/[micron], 501 to 600 | 7 | 1 | 0 |
| size/[micron], 601 to 800 | 0 | 0 | 1 |
| size/[micron], 801 to 1600 | 2 | 0 | 0 |
| size/[micron], GT 1600 | 0 | 0 | 0 |
| Composite gel count | 156 | 27 | 25 |

TABLE 3

Example 2--Granule Extrusion and Screening Conditions

| | Test Number | | |
|---|---|---|---|
| Granule sample | 4<br>#2 | 5<br>#2 | 6<br>#2 |
| Feed Rate, lb/hr | 410.0 | 410.0 | 410.0 |
| Additive Formulation | Form. A | Form. A | Form. A |
| Mixer Speed, rpm | 222.8 | 222.8 | 224.4 |
| Barrel Oil Temp. Set Point, ° C. | 180.0 | 180.0 | 180.0 |
| Gate Position, % | 5.0 | 5.0 | 5.0 |
| Oxygen Conc. - Supply, % | 0.2 | 0.1 | 0.1 |
| Oxygen Conc. - Feed Hopper, % | 0.7 | 0.4 | 0.4 |
| Oxygen Conc. - Vent, % | 0.1 | 0.1 | 0.1 |
| Feed Temp., ° C. | 20.0 | 21.1 | 20.8 |
| Cal. Polymer Temp. on GMP, ° C. | 389.7 | 394.8 | 395.7 |
| Mixer Torque, in-lb | 17492.0 | 17819.0 | 17686.0 |
| Mixer Power on Torque, kw | 45.2 | 46.1 | 46.0 |
| Cal. Power on Torque, kw | 46.1 | 47.0 | 47.0 |
| Mixer SEI on Torque, hp-hr/lb | 0.1478 | 0.1506 | 0.1505 |
| Cal. Polymer Temp. on Torque, ° C. | 248.4 | 254.3 | 254.0 |
| Gate Indicated Temperature, ° C. | 191.2 | 191.5 | 191.9 |
| Ind. Discharge Polymer Temp., ° C. | 241.9 | 242.3 | 242.8 |
| Ind. Transition Temperature, ° C. | 1200.0 | 1200.0 | 1200.0 |
| G/P Discharge Pressure, psig | 2092.8 | 3135.5 | 3642.2 |
| G/P Discharge Temperature, ° C. | 201.7 | 202.7 | 204.4 |
| G/P Speed, rpm | 5.5 | 6.5 | 7.2 |
| G/P Current, amps | 33.0 | 43.0 | 46.4 |
| G/P Volumetric Efficiency, % | 82.7 | 70.0 | 63.2 |
| G/P Fill Factor | 0.158 | 0.187 | 0.207 |
| Gross G/P Power, kw | 3.7 | 5.5 | 6.4 |
| G/P Torque, in-lb | 695.2 | 880.8 | 973.7 |
| G/P Power, kw | 2.4 | 3.6 | 4.4 |
| G/P SEI, hp-hr/lb | 0.0079 | 0.0119 | 0.0145 |
| Calculated Delta Temperature, ° C. | 9.1 | 13.6 | 17.1 |

TABLE 3-continued

Example 2--Granule Extrusion and Screening Conditions

| | Test Number | | |
|---|---|---|---|
| Granule sample | 4<br>#2 | 5<br>#2 | 6<br>#2 |
| Die Pressure, psig | 1421.2 | 1442.0 | 1437.1 |
| Ind. Die Melt Temperature, ° C. | 225.2 | 225.4 | 225.5 |
| Screen Mesh - 1 Bolt | None | 20/100/200/100/20 | 20/100/250/100/250/100/20 |

TABLE 4

Example 2--Film Extrusion Conditions and Gel Count Data

| | Test Number | | |
|---|---|---|---|
| | 4 | 5 | 6 |
| Zone 1 Temp (° C.): - STPT/Actual | 215 | 215 | 215 |
| Zone 2 Temp (° C.): - STPT/Actual | 235 | 235 | 235 |
| Die Temp (° C.): - STPT/Actual | 235 | 235 | 235 |
| Extruder RPM 0-100 (RPM) | 50 | 50 | 50 |
| Extruder Torque (MG) | 2656 | 2732 | 2736 |
| Barrel discharge melt pressure (PSI) | 1392 | 1378 | 1387 |
| Barrel discharge melt temperature (° C.) | 223 | 222 | 223 |
| Die melt temperature (PSI) | 1073 | 1078 | 1104 |
| Die discharge melt temperature (° C.) | 243 | 247 | 247 |
| Chiller water temperature, STPT(° C.) | 60 | 60 | 60 |
| Chill rolls, STPT (% Motor) | 28 | 28 | 28 |
| Tension Roll Speed STPT (F/MIN) | 10 | 10 | 10 |
| Film thickness (Microns) | 63 | 63 | 63 |
| Chill roll gap | Open | Open | Open |
| Chill roll follower gap | Open | Open | Open |
| Screen pack installed | None | None | None |
| Air curtain used (Y [SCFM]/N) | N | N | N |
| OCS Film Clarity (%) | 22.8 | 23 | 23 |
| OCS Grey Level | 150 | 150 | 150 |
| Total Gels avg/[$m^2$] | 3313 | 2729 | 1646 |
| size/[micron], 7 to 54 | 2650 | 2217 | 1355 |
| size/[micron], 55 to 100 | 519 | 473 | 265 |
| size/[micron], 101 to 200 | 99 | 38 | 22 |
| size/[micron], 201 to 300 | 20 | 2 | 4 |
| size/[micron], 301 to 400 | 15 | 0 | 0 |
| size/[micron], 401 to 500 | 2 | 0 | 0 |
| size/[micron], 501 to 600 | 2 | 0 | 0 |
| size/[micron], 601 to 800 | 4 | 0 | 0 |
| size/[micron], 801 to 1600 | 0 | 0 | 0 |
| size/[micron], GT 1600 | 0 | 0 | 0 |
| Composite gel count | 107 | 6 | 6 |

TABLE 5

Example 3--Granule Extrusion and Screening Conditions

| | Test Number | | | | |
|---|---|---|---|---|---|
| Granule sample | 7<br>#3 | 8<br>#3 | 8<br>#3 | 10<br>#3 | 11<br>#3 |
| Feed Rate, lb/hr | 410.0 | 410.0 | 410.0 | 410.0 | 410.0 |
| Additive Formulation | Form. A | Form. A | Form. A | Form. A | Form. A |
| Mixer Speed, rpm | 219.5 | 219.1 | 219.3 | 220.0 | 219.6 |
| Barrel Oil Temp. Set Point, ° C. | 180.0 | 180.0 | 180.0 | 180.0 | 180.0 |
| Gate Position, % | 5.2 | 5.2 | 5.1 | 5.2 | 5.2 |
| Oxygen Conc. - Supply, % | 0.3 | 0.2 | 0.2 | 0.2 | 0.2 |
| Oxygen Conc. - Feed Hopper, % | 0.3 | 0.3 | 0.3 | 0.3 | 0.3 |
| Oxygen Conc. - Vent, % | 0.4 | 0.4 | 0.2 | 0.3 | 0.2 |
| Feed Temp., ° C. | 21.5 | 20.0 | 20.9 | 20.4 | 20.8 |
| Cal. Polymer Temp. on GMP, ° C. | 335.8 | 344.2 | 340.1 | 340.9 | 345.4 |
| Mixer Torque, in-lb | 15505.0 | 15941.0 | 15893.0 | 15784.0 | 16099.0 |
| Mixer Power on Torque, kw | 39.5 | 40.5 | 40.4 | 40.3 | 41.0 |
| Cal. Power on Torque, kw | 40.3 | 41.3 | 41.3 | 41.1 | 41.8 |
| Mixer SEI on Torque, hp-hr/lb | 0.1291 | 0.1325 | 0.1322 | 0.1317 | 0.1341 |
| Cal. Polymer Temp. on Torque, ° C. | 215.3 | 220.3 | 220.5 | 219.2 | 223.9 |
| Gate Indicated Temperature, ° C. | 164.5 | 165.3 | 163.6 | 165.4 | 165.7 |
| Ind. Discharge Polymer Temp., ° C. | 225.1 | 226.6 | 225.3 | 226.3 | 226.1 |
| Ind. Transition Temperature, ° C. | 193.8 | 192.9 | 190.9 | 189.8 | 189.5 |
| G/P Discharge Pressure, psig | 2017.1 | 2603.2 | 3033.0 | 3164.8 | 3667.9 |
| G/P Discharge Temperature, ° C. | 198.5 | 199.0 | 200.1 | 199.6 | 200.5 |
| G/P Speed, rpm | 5.6 | 5.5 | 6.1 | 6.2 | 6.9 |
| G/P Current, amps | 33.3 | 41.0 | 41.0 | 46.3 | 48.1 |
| G/P Volumetric Efficiency, % | 81.2 | 82.7 | 74.5 | 73.3 | 65.9 |
| G/P Fill Factor | 0.161 | 0.158 | 0.175 | 0.178 | 0.198 |
| Gross G/P Power, kw | 3.5 | 4.2 | 5.1 | 5.4 | 6.6 |
| G/P Torque, in-lb | 734.2 | 839.2 | 903.2 | 936.2 | 1029.9 |
| G/P Power, kw | 2.6 | 2.9 | 3.5 | 3.7 | 4.5 |
| G/P SEI, hp-hr/lb | 0.0085 | 0.0096 | 0.0114 | 0.0120 | 0.0147 |
| Calculated Delta Temperature, ° C. | 10.4 | 10.8 | 13.0 | 13.8 | 17.4 |
| Die Pressure, psig | 1529.9 | 1637.4 | 1483.5 | 1548.2 | 1593.4 |
| Ind. Die Melt Temperature, ° C. | 225.2 | 224.3 | 225.4 | 224.4 | 225.5 |
| Screen Mesh - 1 Bolt | None | 20/100/20 | 20/100/150/100/20 | 20/100/200/100/20 | 20/100/250/100/250/100/20 |

TABLE 6

Example 3--Film Extrusion Conditions and Gel Count Data

| | Test Number | | | | |
|---|---|---|---|---|---|
| | 7 | 8 | 8 | 10 | 11 |
| Zone 1 Temp (° C.): - STPT/Actual | 215 | 215 | 215 | 215 | 215 |
| Zone 2 Temp (° C.): - STPT/Actual | 235 | 235 | 235 | 235 | 235 |
| Dié Temp (° C.): - STPT/Actual | 235 | 235 | 235 | 235 | 235 |
| Extruder RPM 0-100 (RPM) | 50 | 50 | 50 | 50 | 50 |
| Extruder Torque (MG) | 3022 | 2948 | 2989 | 2980 | 2914 |
| Barrel discharge melt pressure (PSI) | 1427 | 1469 | 1443 | 1484 | 1484 |
| Barrel discharge melt temperature (° C.) | 222 | 223 | 222 | 221 | 222 |
| Die melt temperature (PSI) | 1123 | 1130 | 1123 | 1153 | 1125 |
| Die discharge melt temperature (° C.) | 247 | 248 | 248 | 247 | 247 |
| Chiller water temperature, STPT(° C.) | 60 | 60 | 60 | 60 | 60 |
| Chill rolls, STPT (% Motor) | 28 | 28 | 28 | 28 | 28 |
| Tension Roll Speed STPT (F/MIN) | 10 | 10 | 10 | 10 | 10 |

TABLE 6-continued

Example 3--Film Extrusion Conditions and Gel Count Data

| | Test Number | | | | |
|---|---|---|---|---|---|
| | 7 | 8 | 8 | 10 | 11 |
| Film thickness (Microns) | 63 | 63 | 63 | 63 | 63 |
| Chill roll gap | Open | Open | Open | Open | Open |
| Chill roll follower gap | Open | Open | Open | Open | Open |
| Screen pack installed | None | None | None | None | None |
| Air curtain used (Y [SCFM]/N) | Y | Y | Y | Y | Y |
| OCS Film Clarity (%) | 23.1 | 22.6 | 23.2 | 23.2 | 23.3 |
| OCS Grey Level | 150 | 150 | 150 | 150 | 150 |
| Total Gels avg/[m$^2$] | 2716 | 2022 | 2214 | 1646 | 1408 |
| size/[micron], 7 to 54 | 2192 | 1684 | 1719 | 1388 | 1211 |
| size/[micron], 55 to 100 | 404 | 294 | 415 | 236 | 177 |
| size/[micron], 101 to 200 | 95 | 35 | 73 | 22 | 20 |
| size/[micron], 201 to 300 | 18 | 4 | 4 | 0 | 0 |
| size/[micron], 301 to 400 | 2 | 0 | 0 | 0 | 0 |

TABLE 6-continued

Example 3--Film Extrusion Conditions and Gel Count Data

| | Test Number | | | | |
|---|---|---|---|---|---|
| | 7 | 8 | 8 | 10 | 11 |
| size/[micron], 401 to 500 | 2 | 2 | 2 | 0 | 0 |
| size/[micron], 501 to 600 | 2 | 2 | 0 | 0 | 0 |
| size/[micron], 601 to 800 | 0 | 0 | 0 | 0 | 0 |
| size/[micron], 801 to 1600 | 0 | 0 | 0 | 0 | 0 |
| size/[micron], GT 1600 | 0 | 0 | 0 | 0 | 0 |
| Composite gel count | 52 | 30 | 13 | 2 | 2 |

TABLE 7

Example 4--Granule Extrusion and Screening Conditions

| | Data Point Number | | | | | | |
|---|---|---|---|---|---|---|---|
| | 1 | 2 | 3 | 4 | 5 | 6 | 7 |
| Day | Day 1 | Day 1 | Day 1 | Day 1 | Day 2 | Day 2 | Day 2 |
| Time | 12:31:16 | 12:57:40 | 13:30:38 | 14:30:48 | 11:13:14 | 12:25:35 | 13:08:06 |
| Granule sample | 3 | 3 | 3 | 3 | 3 | 3 | 3 |
| Feed Rate, lb/hr | 410.0 | 410.0 | 410.0 | 410.0 | 410.0 | 410.0 | 410.0 |
| Additive Formulation | Form. A | Form. A | Form. A | Form. A | Form. A | Form. A | Form. A |
| Mixer Speed, rpm | 218.5 | 219.6 | 218.7 | 219.8 | 220.9 | 220.5 | 221.4 |
| Barrel Oil Temp. Set Point, ° C. | 180.0 | 180.0 | 180.0 | 180.0 | 180.0 | 180.0 | 180.0 |
| Gate Position, % | 5.1 | 5.1 | 5.1 | 5.2 | 5.1 | 5.2 | 5.2 |
| Oxygen Conc. - Supply, % | 0.2 | 0.2 | 0.1 | 0.1 | 0.4 | 0.3 | 0.3 |
| Oxygen Conc. - Feed Hopper, % | 0.3 | 0.2 | 0.2 | 0.2 | 0.3 | 0.3 | 0.3 |
| Oxygen Conc. - Vent, % | 0.2 | 0.2 | 0.2 | 0.2 | 0.3 | 0.3 | 0.3 |
| Feed Temp., ° C. | 20.4 | 19.6 | 20.9 | 21.5 | 24.3 | 23.5 | 23.3 |
| Cal. Polymer Temp. on GMP, ° C. | 336.1 | 345.7 | 343.1 | 350.8 | 326.6 | 302.6 | 291.7 |
| Mixer Torque, in-lb | 15711.0 | 16329.0 | 15832.0 | 16171.0 | 15093.0 | 14075.0 | 13542.0 |
| Mixer Power on Torque, kw | 39.8 | 41.6 | 40.2 | 41.2 | 38.7 | 36.0 | 34.8 |
| Cal. Power on Torque, kw | 40.6 | 42.4 | 41.0 | 42.1 | 39.5 | 36.7 | 35.5 |
| Mixer SEI on Torque, hp-hr/lb | 0.1302 | 0.1360 | 0.1313 | 0.1348 | 0.1264 | 0.1177 | 0.1137 |
| Cal. Polymer Temp. on Torque, ° C. | 987.1 | 997.1 | 989.6 | 996.4 | 983.3 | 966.7 | 959.2 |
| Gate Indicated Temperature, ° C. | 164.2 | 163.6 | 163.6 | 165.2 | 163.2 | 164.6 | 165.9 |
| Ind. Discharge Polymer Temp., ° C. | 226.3 | 224.6 | 225.6 | 225.9 | 218.6 | 220.2 | 222.0 |
| Ind. Transition Temperature, ° C. | 195.7 | 198.7 | 198.8 | 190.2 | 195.7 | 194.1 | 199.2 |
| G/P Discharge Pressure, psig | 3105.0 | 3063.5 | 3103.8 | 3284.5 | 3354.1 | 3297.9 | 3275.9 |
| G/P Discharge Temperature, ° C. | 199.5 | 199.5 | 199.6 | 199.9 | 196.9 | 196.5 | 197.4 |
| G/P Speed, rpm | 6.2 | 6.4 | 6.6 | 6.8 | 7.0 | 6.6 | 5.9 |
| G/P Current, amps | 43.3 | 46.6 | 43.7 | 44.4 | 45.6 | 44.3 | 46.1 |
| G/P Fill Factor | 0.178 | 0.184 | 0.189 | 0.195 | 0.201 | 0.189 | 0.169 |
| Gross G/P Power, kw | 5.2 | 5.3 | 5.3 | 5.8 | 6.0 | 5.4 | 5.1 |
| G/P Torque, in-lb | 918.6 | 917.9 | 918.6 | 956.1 | 968.1 | 955.0 | 940.3 |
| G/P Power, kw | 3.6 | 3.7 | 3.8 | 4.1 | 4.3 | 4.0 | 3.5 |
| G/P SEI, hp-hr/lb | 0.0118 | 0.0122 | 0.0126 | 0.0135 | 0.0141 | 0.0131 | 0.0115 |
| Calculated Delta Temperature, ° C. | 13.5 | 14.3 | 14.9 | 16.1 | 17.0 | 15.3 | 12.5 |
| Die Pressure, psig | 1495.7 | 1554.3 | 1544.6 | 1619.0 | 1600.7 | 1489.6 | 1503.1 |
| Ind. Die Melt Temperature, ° C. | 224.4 | 224.1 | 224.2 | 224.9 | 222.5 | 222.8 | 223.2 |
| Screen Mesh - 1 Bolt | 20/100/200/100/20 | 20/100/200/100/20 | 20/100/200/100/20 | 20/100/200/100/20 | 20/100/200/100/20 | 20/100/200/100/20 | 20/100/200/100/20 |

| | Data Point Number | | | | | |
|---|---|---|---|---|---|---|
| | 8 | 9 | 10 | 11 | 12 | 13 |
| Day | Day 2 | Day 2 | Day 3 | Day 3 | Day 3 | Day 3 |
| Time | 14:00:45 | 14:30:37 | 09:51:23 | 11:12:50 | 12:39:19 | 13:52:41 |
| Granule sample | 3 | 3 | 3 | 3 | 3 | 3 |
| Feed Rate, lb/hr | 410.0 | 410.0 | 410.0 | 410.0 | 410.0 | 410.0 |
| Additive Formulation | Form. A | Form. A | Form. A | Form. A | Form. A | Form. A |
| Mixer Speed, rpm | 222.0 | 221.9 | 219.5 | 220.4 | 220.5 | 220.0 |
| Barrel Oil Temp. Set Point, ° C. | 180.0 | 180.0 | 180.0 | 180.0 | 180.0 | 180.0 |
| Gate Position, % | 5.1 | 5.2 | 5.2 | 5.2 | 5.1 | 5.1 |
| Oxygen Conc. - Supply, % | 0.2 | 0.2 | 0.3 | 0.3 | 0.2 | 0.2 |
| Oxygen Conc. - Feed Hopper, % | 0.3 | 0.3 | 0.3 | 0.2 | 0.2 | 0.2 |
| Oxygen Conc. - Vent, % | 0.3 | 0.3 | 0.3 | 0.2 | 0.2 | 0.2 |
| Feed Temp., ° C. | 24.1 | 24.1 | 23.3 | 22.3 | 23.5 | 22.3 |
| Cal. Polymer Temp. on GMP, ° C. | 321.1 | 306.7 | 281.5 | 309.5 | 293.6 | 280.7 |
| Mixer Torque, in-lb | 14451.0 | 14330.0 | 13457.0 | 14499.0 | 13675.0 | 13094.0 |

TABLE 7-continued

| Example 4--Granule Extrusion and Screening Conditions | | | | | | |
|---|---|---|---|---|---|---|
| Mixer Power on Torque, kw | 37.2 | 36.9 | 34.3 | 37.1 | 35.0 | 33.4 |
| Cal. Power on Torque, kw | 38.0 | 37.6 | 35.0 | 37.8 | 35.7 | 34.1 |
| Mixer SEI on Torque, hp-hr/lb | 0.1217 | 0.1206 | 0.1120 | 0.1212 | 0.1144 | 0.1093 |
| Cal. Polymer Temp. on Torque, ° C. | 974.4 | 972.5 | 956.1 | 972.1 | 960.6 | 950.3 |
| Gate Indicated Temperature, ° C. | 163.2 | 162.9 | 163.9 | 164.1 | 163.2 | 163.5 |
| Ind. Discharge Polymer Temp., ° C. | 218.2 | 219.2 | 221.7 | 221.5 | 220.1 | 221.4 |
| Ind. Transition Temperature, ° C. | 184.7 | 189.3 | 197.9 | 189.5 | 189.5 | 190.7 |
| G/P Discharge Pressure, psig | 3294.3 | 3368.7 | 3284.5 | 3444.4 | 3381.0 | 3271.1 |
| G/P Discharge Temperature, ° C. | 197.2 | 196.7 | 196.9 | 197.1 | 196.6 | 196.3 |
| G/P Speed, rpm | 6.1 | 6.7 | 5.9 | 6.6 | 6.6 | 6.1 |
| G/P Current, amps | 47.6 | 43.4 | 46.9 | 47.3 | 48.8 | 46.5 |
| G/P Fill Factor | 0.175 | 0.192 | 0.169 | 0.189 | 0.189 | 0.175 |
| Gross G/P Power, kw | 5.4 | 5.5 | 5.0 | 6.0 | 5.4 | 5.0 |
| G/P Torque, in-lb | 945.6 | 958.7 | 945.2 | 991.7 | 965.4 | 931.0 |
| G/P Power, kw | 3.7 | 4.1 | 3.5 | 4.2 | 4.0 | 3.6 |
| G/P SEI, hp-hr/lb | 0.0120 | 0.0133 | 0.0116 | 0.0136 | 0.0132 | 0.0118 |
| Calculated Delta Temperature, ° C. | 13.3 | 15.6 | 12.6 | 15.9 | 15.4 | 13.0 |
| Die Pressure, psig | 1551.9 | 1533.6 | 1456.7 | 1537.2 | 1532.4 | 1529.9 |
| Ind. Die Melt Temperature, ° C. | 222.7 | 223.0 | 224.1 | 223.8 | 223.4 | 224.3 |
| Screen Mesh - 1 Bolt | 20/100/200/100/20 | 20/100/200/100/20 | 20/100/200/100/20 | 20/100/200/100/20 | 20/100/200/100/20 | 20/100/200/100/20 |

| | Data Point Number | | | | | |
|---|---|---|---|---|---|---|
| | 14 | 15 | 16 | 17 | 18 | 19 |
| Day | Day 4 | Day 4 | Day 4 | Day 4 | Day 4 | Day 4 |
| Time | 09:00:19 | 09:58:01 | 10:48:39 | 11:47:52 | 13:02:43 | 14:00:21 |
| Granule sample | 3 | 3 | 3 | 3 | 3 | 3 |
| Feed Rate, lb/hr | 410.0 | 410.0 | 410.0 | 410.0 | 410.0 | 410.0 |
| Additive Formulation | Form. A | Form. A | Form. A | Form. A | Form. A | Form. A |
| Mixer Speed, rpm | 219.8 | 219.7 | 219.7 | 218.5 | 218.2 | 218.7 |
| Barrel Oil Temp. Set Point, ° C. | 180.0 | 180.0 | 180.0 | 180.0 | 180.0 | 180.0 |
| Gate Position, % | 5.1 | 5.1 | 5.2 | 5.1 | 5.1 | 5.2 |
| Oxygen Conc. - Supply, % | 0.3 | 0.2 | 0.2 | 0.1 | 0.1 | 0.1 |
| Oxygen Conc. - Feed Hopper, % | 0.3 | 0.2 | 0.2 | 0.2 | 0.2 | 0.2 |
| Oxygen Conc. - Vent, % | 0.3 | 0.3 | 0.2 | 0.2 | 0.2 | 0.2 |
| Feed Temp., ° C. | 22.3 | 21.3 | 20.8 | 22.4 | 22.1 | 22.1 |
| Cal. Polymer Temp. on GMP, ° C. | 295.1 | 285.9 | 283.1 | 287.4 | 274.0 | 267.4 |
| Mixer Torque, in-lb | 13881.0 | 13554.0 | 13372.0 | 13348.0 | 13142.0 | 12912.0 |
| Mixer Power on Torque, kw | 35.4 | 34.5 | 34.1 | 33.8 | 33.3 | 32.8 |
| Cal. Power on Torque, kw | 36.1 | 35.2 | 34.8 | 34.5 | 33.9 | 33.4 |
| Mixer SEI on Torque, hp-hr/lb | 0.1157 | 0.1129 | 0.1114 | 0.1106 | 0.1088 | 0.1071 |
| Cal. Polymer Temp. on Torque, ° C. | 962.1 | 956.2 | 953.0 | 952.8 | 949.2 | 946.2 |
| Gate Indicated Temperature, ° C. | 163.2 | 165.2 | 163.4 | 163.2 | 163.5 | 163.2 |
| Ind. Discharge Polymer Temp., ° C. | 222.6 | 223.1 | 221.5 | 220.8 | 221.2 | 221.2 |
| Ind. Transition Temperature, ° C. | 197.6 | 194.8 | 186.1 | 185.4 | 187.6 | 184.7 |
| G/P Discharge Pressure, psig | 3381.0 | 3527.5 | 3468.9 | 3471.3 | 3437.1 | 3445.7 |
| G/P Discharge Temperature, ° C. | 195.8 | 195.4 | 194.4 | 194.7 | 194.4 | 197.1 |
| G/P Speed, rpm | 6.0 | 6.0 | 6.5 | 5.8 | 5.7 | 5.9 |
| G/P Current, amps | 48.2 | 49.7 | 46.6 | 44.2 | 43.9 | 45.5 |
| G/P Fill Factor | 0.172 | 0.172 | 0.187 | 0.166 | 0.164 | 0.169 |
| Gross G/P Power, kw | 5.6 | 5.6 | 5.6 | 5.3 | 5.3 | 5.4 |
| G/P Torque, in-lb | 971.8 | 988.7 | 977.1 | 980.8 | 969.2 | 971.4 |
| G/P Power, kw | 3.7 | 3.8 | 4.0 | 3.6 | 3.5 | 3.6 |
| G/P SEI, hp-hr/lb | 0.0121 | 0.0123 | 0.0132 | 0.0118 | 0.0115 | 0.0119 |
| Calculated Delta Temperature, ° C. | 13.3 | 13.3 | 15.1 | 12.6 | 12.0 | 12.8 |
| Die Pressure, psig | 1437.1 | 1477.4 | 1518.9 | 1511.6 | 1465.2 | 1493.3 |
| Ind. Die Melt Temperature, ° C. | 223.8 | 223.9 | 223.9 | 223.8 | 223.7 | 223.7 |
| Screen Mesh - 1 Bolt | 20/100/200/100/20 | 20/100/200/100/20 | 20/100/200/100/20 | 20/100/200/100/20 | 20/100/200/100/20 | 20/100/200/100/20 |

What is claimed is:

1. A process of producing a polyolefin comprising:

(a) providing a polyolefin having an $I_{21}$ value of from 2 to 100 g/10 min and a density of from 0.91 to 0.97 g/cm$^3$;

(b) forming a melt of the polyolefin and passing the polyolefin through one active screen filter having a mesh size of from 70 to 200 micron at a mass flux of from 5 to 100 lbs/hr/square inch;

(c) isolating the polyolefin having passed through the screen filter.

2. The process of claim 1, wherein the polyolefin is a polyethylene having an $I_{21}$ of from 4 to 20 g/0 min and a density of from 0.93 to 0.96 g/cm$^3$.

3. The process of claim 2, wherein the polyethylene has a molecular weight distribution (Mw/Mn) ranging from 20 to 100.

4. The process of claim 1, wherein the polyolefin is formed into a film possessing a composite gel count of less than 50.

5. The process of claim 1, wherein the mass flux ranges from 10 to 50 lbs/hr/square inch.

6. The process of claim 1, wherein the active screen filter possesses a mesh size of from 70 to 150 micron.

7. The process of claim 1, wherein the formation of the melt of the polyolefin and the passing of the polyolefin through one screen filter is accomplished through an extruder having a gear pump, and wherein the gear pump discharge pressure increases by less than 25% from the starting pressure per 24 hours of continuous output.

8. The process of claim 1, wherein there are one or more passive screens to reinforce the active screens.

9. The process of claim 1, wherein the melt is also blended prior to passing through the screen.

10. The process of claim 3, wherein the polyethylene is a bimodal polyethylene produced in a single continuous gas phase fluidized bed reactor.

11. A process of producing a polyethylene comprising:

(a) providing a polyethylene having an $I_{21}$ value of from 2 to 100 g/10 min and a density of from 0.91 to 0.97 g/cm$^3$;

(b) forming a melt of the polyethylene and passing the polyethylene through one or more active screen filters having a mesh size of from 70 to 200 microns at a mass flux of from 5 to 100 lbs/hr/square inch;

(c) isolating the polyethylene having passed through the screen filter.

12. The process of claim 11, wherein the polyethylene has an $I_{21}$ of from 4 to 20 g/10 min and a density of from 0.93 to 0.96 g/cm$^3$.

13. The process of claim 11, wherein the polyethylene has an $I_{21}$ of from 2 to 80 g/10 min and a density of from 0.91 to 0.93 g/cm$^3$.

14. The process of claim 12, wherein the polyethylene has a molecular weight distribution (Mw/Mn) ranging from 20 to 100.

15. The process of claim 13, wherein the polyethylene has a molecular weight distribution (Mw/Mn) ranging from 2 to 5.

16. The process of claim 11, wherein the polyethylene is formed into a film possessing a composite gel count of less than 50.

17. The process of claim 11, wherein the mass flux ranges from 10 to 50 lbs/hr/square inch.

18. The process of claim 11, wherein the active screen filter possesses a mesh size of from 70 to 150 micron.

19. The process of claim 11, wherein the formation of the melt of the polyethylene and the passing of the polyethylene through the one or more screen filter(s) is accomplished through an extruder having a gear pump, and wherein the gear pump discharge pressure increases by less than 25% from the starting pressure per 24 hours of continuous output.

20. The process of claim 11, wherein there are one or more passive screens to reinforce the active screens.

21. The process of claim 11, wherein the melt is also blended prior to passing through the screen.

22. The process of claim 12, wherein the polyethylene is a bimodal polyethylene produced in a single continuous gas phase fluidized bed reactor.

* * * * *